(12) United States Patent
Wang et al.

(10) Patent No.: US 9,537,141 B2
(45) Date of Patent: Jan. 3, 2017

(54) METHOD FOR MAKING LITHIUM ION BATTERY ELECTRODE

(71) Applicants: Jia-Ping Wang, Beijing (CN); Kai-Li Jiang, Beijing (CN); Shou-Shan Fan, Beijing (CN)

(72) Inventors: Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 427 days.

(21) Appl. No.: 13/662,768

(22) Filed: Oct. 29, 2012

(65) Prior Publication Data
US 2014/0013589 A1 Jan. 16, 2014

(30) Foreign Application Priority Data
Jul. 13, 2012 (CN) .......................... 2012 1 0242386 8

(51) Int. Cl.
*H01M 4/1393* (2010.01)
*H01M 4/139* (2010.01)
*H01M 4/62* (2006.01)
*H01M 4/66* (2006.01)

(52) U.S. Cl.
CPC ............. *H01M 4/139* (2013.01); *H01M 4/625* (2013.01); *H01M 4/663* (2013.01); *Y02E 60/122* (2013.01); *Y02P 70/54* (2015.11); *Y10T 29/49108* (2015.01); *Y10T 29/49115* (2015.01)

(58) Field of Classification Search
CPC .... H01M 4/1393; H01M 4/139; H01M 4/625; H01M 4/663; Y10T 29/49115; Y10T 29/49108; Y02E 60/122; Y02P 70/54
See application file for complete search history.

(56) References Cited

U.S. PATENT DOCUMENTS

| 2006/0177659 | A1* | 8/2006 | Chen et al. ................... 428/403 |
| 2009/0117467 | A1 | 5/2009 | Zhamu et al. |
| 2010/0140219 | A1* | 6/2010 | Liang ..................... B82Y 30/00 216/41 |

(Continued)

FOREIGN PATENT DOCUMENTS

| CN | 101420021 | 4/2009 |
| CN | 101768012 | 7/2010 |

(Continued)

OTHER PUBLICATIONS

Virendra Singh, Daeha Joung, Lei Zhai, Soumen Das, Saiful I. Khondaker, Sudipta Seal "Graphene based materials: Past, present and futrue", available online Apr. 2011, Pertinent p. 1183.*

(Continued)

*Primary Examiner* — Miriam Stagg
*Assistant Examiner* — Lilia V Nedialkova
(74) *Attorney, Agent, or Firm* — Zhigang Ma

(57) ABSTRACT

A method for making a lithium ion battery electrode is provided. A support having a support surface is provided. A graphene layer is formed on the support surface of the support. An electrode material layer is applied on an exposed surface of the graphene layer. The graphene layer is located between the electrode material layer and the support.

14 Claims, 4 Drawing Sheets

(56) References Cited

U.S. PATENT DOCUMENTS

| | | | |
|---|---|---|---|
| 2010/0151318 A1* | 6/2010 | Lopatin | B82Y 30/00 429/163 |
| 2010/0230641 A1* | 9/2010 | Oki et al. | 252/502 |
| 2010/0248034 A1* | 9/2010 | Oki et al. | 429/231.8 |
| 2010/0323246 A1 | 12/2010 | Feng et al. | |
| 2012/0064409 A1* | 3/2012 | Zhamu | B82Y 30/00 429/221 |
| 2012/0183856 A1 | 7/2012 | Cui et al. | |
| 2012/0244430 A1* | 9/2012 | Yamazaki et al. | 429/211 |
| 2013/0095389 A1* | 4/2013 | Bhardwaj | H01M 4/663 429/322 |
| 2014/0315083 A1 | 10/2014 | Liu et al. | |

FOREIGN PATENT DOCUMENTS

| | | |
|---|---|---|
| CN | 101811690 | 8/2010 |
| CN | 101849302 | 9/2010 |
| CN | 102208598 | 10/2011 |
| CN | 102460782 | 5/2012 |

OTHER PUBLICATIONS

Machine translation of Chinese Patent Publication No. 101768012, published on Jul. 7, 2010.*

Electrochamical Performance of Si/Carbon/Carbon Nano-tube Composite Anode Materials for Lithium-ion Battery, Luan zhenxing et al., Material&Heat Treatment,vol. 40,No. 4.

* cited by examiner

Providing a support 12a including a support surface

↓

Forming a graphene layer 12b on the support surface of the support 12a; and

↓

Forming an electrode material layer 144 on an exposed surface of the graphene layer 12b opposite the support 12a

FIG. 2

METHOD FOR MAKING LITHIUM ION BATTERY ELECTRODE

RELATED APPLICATIONS

This application claims all benefits accruing under 35 U.S.C. §119 from China Patent Application No. 201210242386.8, filed on Jul. 13, 2012, in the China Intellectual Property Office, the disclosure of which is incorporated herein by reference. The application is also related to copending applications entitled, "METHOD FOR MAKING LITHIUM ION BATTERY", having serial number of Ser. No. 13/662,718; "LITHIUM ION BATTERY", having serial number of Ser. No. 13/662,727; "LITHIUM ION BATTERY ELECTRODE", having serial number of Ser. No. 13/676,426; "METHOD FOR MAKING LITHIUM ION BATTERY", having serial number of Ser. No. 13/630,004; "THIN FILM LITHIUM ION BATTERY", having serial number of Ser. No. 13/628,237; "THIN FILM LITHIUM ION BATTERY", having serial number of Ser. No. 13/685,802; "METHOD FOR MAKING THIN FILM LITHIUM ION BATTERY", having serial number of Ser. No. 13/685,803.

BACKGROUND

1. Technical Field

The present disclosure relates to a method for making a lithium ion battery electrode.

2. Description of Related Art

A lithium ion battery includes a case, an anode, a cathode, a non-aqueous electrolyte, and a separator. The anode and the cathode are both lithium battery electrodes. The anode, cathode, non-aqueous electrolyte, and separator are encapsulated in the case. The separator is located between the anode and the cathode. The anode, cathode, and separator are infiltrated by the non-aqueous electrolyte. The cathode includes a cathode current collector and a cathode material layer disposed on a surface of the cathode current collector. The anode includes an anode current collector and an anode material layer disposed on a surface of the anode current collector.

The current collector is used to collect the charge generated by the lithium ion battery during discharge, and to connect to an external power source during the recharging of the lithium ion battery. The current collectors are usually made of metal foils, such as copper foil and aluminum foil. However, the metal foils have a relatively large weight. The power density is calculated by power/weight. Therefore, a large weight of the current collector will decrease the power density of a lithium ion battery. Furthermore, the metal foils may be corroded by the electrolyte, which decreases the life span of the lithium ion battery.

What is needed, therefore, is to provide a method for making a lithium ion battery electrode having a high power density and a long life.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

FIG. 2 is one embodiment of a flowchart for making a lithium ion battery electrode.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
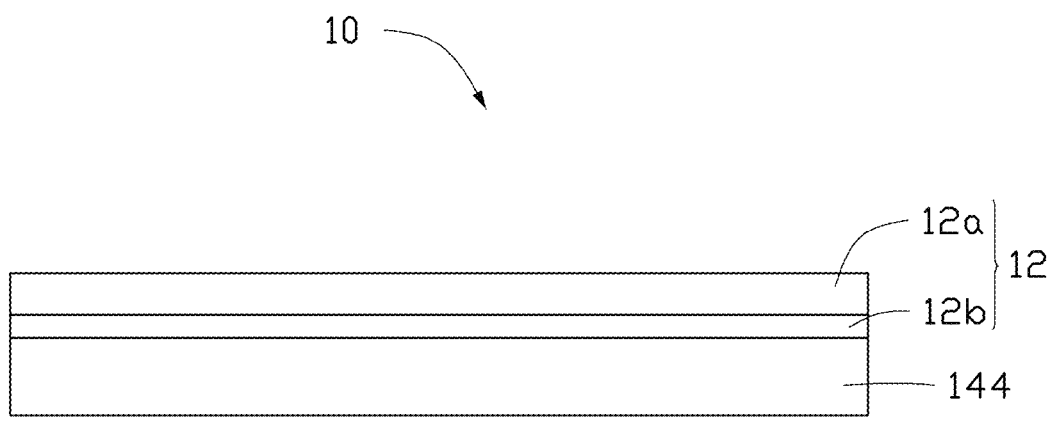
FIG. 1 is a schematic side view of an embodiment of a lithium ion battery electrode.

Referring to FIG. 1, a lithium ion battery electrode 10 of an embodiment includes a current collector 12 and an electrode material layer 144. The electrode material layer 144 is disposed on a surface of the current collector 12. The current collector 12 and the electrode material layer 144 can be two separated layers. The current collector 12 includes a support 12a and a graphene layer 12b. The graphene layer 12b is located on a surface of the support 12a. The graphene layer 12b is attached on a surface of the electrode material layer 144, and located between the electrode material layer 144 and the support 12a.

Referring to FIG. 2, a method for making the lithium ion battery electrode 10 is provided. The method includes the following steps:

S1: providing a support 12a including a support surface;

S2: forming a graphene layer 12b on the support surface of the support 12a, and

S3: forming an electrode material layer 144 on an exposed surface of the graphene layer 12b opposite the support 12a.

In step S1, the support 12a is configured to support the graphene layer 12b. A material of the support 12a has relatively small density and relatively good resistance to corrosion, such as polymer materials, ceramics, crystal, and glass. The material of the support 12a can also be an electrically insulating material. The support 12a can have a layered shape, such as a sheet, a film, or a plate. The thickness of the support 12a can be in a range from about 1 micrometer to about 1 millimeter. The support surface of the support 12a can be planar or curved.

In step S2, the graphene layer 12b is a two dimensional film structure. A thickness of the graphene layer 12b can be in a range from about 10 nanometers (nm) to about 10 micrometers. The graphene layer 12b can include at least one graphene. If the graphene layer 12b includes a plurality of graphenes, the plurality of graphenes can overlap with each other to form a large area, or stacked with each other to form a large thickness. In one embodiment, the graphene layer 12b is a single graphene. The graphene layer 12b can be a free-standing structure. The term "free-standing structure" means that the graphene layer 12b can sustain the weight of itself when it is hoisted by a portion thereof without any significant damage to its structural integrity. So, if the graphene layer 12b is placed between two separate supports, a portion of the graphene layer 12b can be suspended between the two separate supports.

In step S2, the graphene layer 12b can be made by chemical vapor deposition method (CVD), mechanical pressure method, Langmuir-Blodgett (LB) method, solution method, or tearing from oriented graphite using a tape. The graphene layer 12b can be formed first, and then the graphene layer 12b is transferred to the support surface of the support 12a. In one embodiment, the graphene layer 12b is made by the mechanical pressure method, and is formed directly on the support surface of the support 12a. The mechanical pressure method includes:

S21, forming an oxide layer on the support surface of the support 12a using plasma;

S22, providing a highly oriented pyrolytic graphite (HOPG) having a cleavage surface, wherein the cleavage surface is in contact with the oxide layer;

S23, applying a pressure on the HOPG and the support 12a; and

S24, removing the HOPG from the support 12a, thereby forming the graphene layer 12b on the oxide layer of the support 12a.

In step S23, before applying the pressure on the HOPG, the HOPG and the support 12a can be closely clipped in a clamp to be conveniently pressed. The pressing force can be applied on the clamp. The pressing force can be in a range from about 100 N to about 200 N. The pressing force can be applied for about 5 minutes to about 10 minutes. The method for making the graphene layer 12b is carried out in a sterilized room. In one embodiment, the graphene layer 12b is a single graphene layer.

In step S3, a method for making the electrode material layer 144 is not limited. In one embodiment, the electrode material layer 144 is formed by the following sub-steps:

S31: making a carbon nanotube source including a number of carbon nanotubes;

S32: providing a solvent and an electrode active material including a number of electrode active material particles;

S33: adding the carbon nanotube source and the electrode active material into the solvent, and shaking the solvent with the carbon nanotube source and the electrode active material with ultrasonic waves; and S34: separating the carbon nanotube source and the electrode active material from the solvent to obtain the electrode material layer 144.

In step S31, the carbon nanotube source can be made of carbon nanotubes. The carbon nanotubes can be single-walled carbon nanotubes, double-walled carbon nanotubes, or multi-walled carbon nanotubes. Diameters of the carbon nanotubes can be in a range from about 0.5 nanometers to about 100 nanometers. The carbon nanotubes can be pure, meaning there is few or no impurities adhered on surface of the carbon nanotubes. In some embodiments, there are no functional groups attached on the carbon nanotubes. A length of the carbon nanotubes can be the same or different. The length of the carbon nanotubes can be longer than 300 micrometers. In one embodiment, the lengths of the carbon nanotubes are substantially the same. A method for making the carbon nanotube source can include providing a carbon nanotube array, wherein the carbon nanotube array can be formed on a substrate, and scratching the carbon nanotube array from the substrate to form the carbon nanotube source. The carbon nanotube source obtained directly from the carbon nanotube array can make the lithium ion battery electrode stronger. In one embodiment, the carbon nanotube array is a super aligned carbon nanotube array. A method for making the carbon nanotube array can be CVD method, arc discharge method, aerosol method, or any other appropriate method.

In the step S32, the solvent can be ethanol, glycol, acetone, N-Methyl-2-pyrrolidone, water, or combination thereof. In one embodiment, the solvent is ethanol. The solvent is contained in a container, such as a beaker. The electrode active material is a cathode active material or an anode active material. If the electrode material is a cathode active material, the electrode 10 is a cathode of a lithium ion battery, which has a thickness of about 10 micrometers to about 500 micrometers, for example 200 micrometers. If the electrode material is anode active material, the electrode 10 is an anode of a lithium ion battery, which has a thickness of about 10 micrometers to about 500 micrometers, for example 100 micrometers. In one embodiment, the electrode 10 is a cathode having a thickness of about 220 micrometers. The cathode active material can be lithium manganate ($LiMn_2O_4$), lithium cobalt oxide ($LiCoO_2$), lithium nickel oxide ($LiNiO_2$), or lithium iron phosphate ($LiFePO_4$). The anode active material can be natural graphite, pyrolysis carbon, or mesocarbon microbeads (MCMB).

In the step S33, the carbon nanotube source and the electrode active material form a mixture. A weight percentage of the carbon nanotubes in the mixture can be in a range from about 0.1% to about 20%. In some embodiments, the weight percentage of the carbon nanotubes can be in a range from about 1% to about 10%. A power of the ultrasonic wave can be in a range from about 400 W to about 1500 W. In some embodiments, the power is in a range from about 800 W to about 1000 W. A time of shaking using ultrasonic waves can range from about 2 minutes to about 30 minutes. In some embodiments, the shaking time ranges from about 5 minutes to about 10 minutes. The solvent with the carbon nanotube source and the electrode active material can be shaken with ultrasonic waves continuously or at intervals.

In step S34, after the solvent with the carbon nanotube source and the electrode active material is shaken, the carbon nanotubes in the carbon nanotube source and the electrode active material particles in the electrode active material combine with each other to form mixture. The mixture consists of the carbon nanotubes and electrode active material particles. The solvent with the mixture is kept still for about 1 minute to about 20 minutes. The mixture will deposit to a bottom of the container. After the solvent with the carbon nanotube source and the electrode active material is shaken, the carbon nanotubes entangle with each other to form a net structure. The electrode active material particles are wrapped by the net structure and attached on the surface of the carbon nanotubes to form an integrity mixture. The electrode active material particles have a larger density than the solvent, and as such, the integrity mixture can be deposited to the bottom of the container. After the mixture has deposited to the bottom of the solvent, the solvent can be absorbed from the container by a pipe, thereby separating the mixture from the container. After the carbon nanotube source and the electrode active material are separated from the solvent, the mixture of the carbon nanotube source and the electrode active material can be dried at a room temperature or at a temperature from about 25 centigrade to about 80 centigrade. After the mixture is dried, the mixture can be cut directly to form the lithium ion battery electrode. In other embodiments, the mixture can be pressed and then cut to form the lithium ion battery electrode. The electrode material layer 144 made by the above method consists of carbon nanotubes and electrode active material particles.

Figure 3:
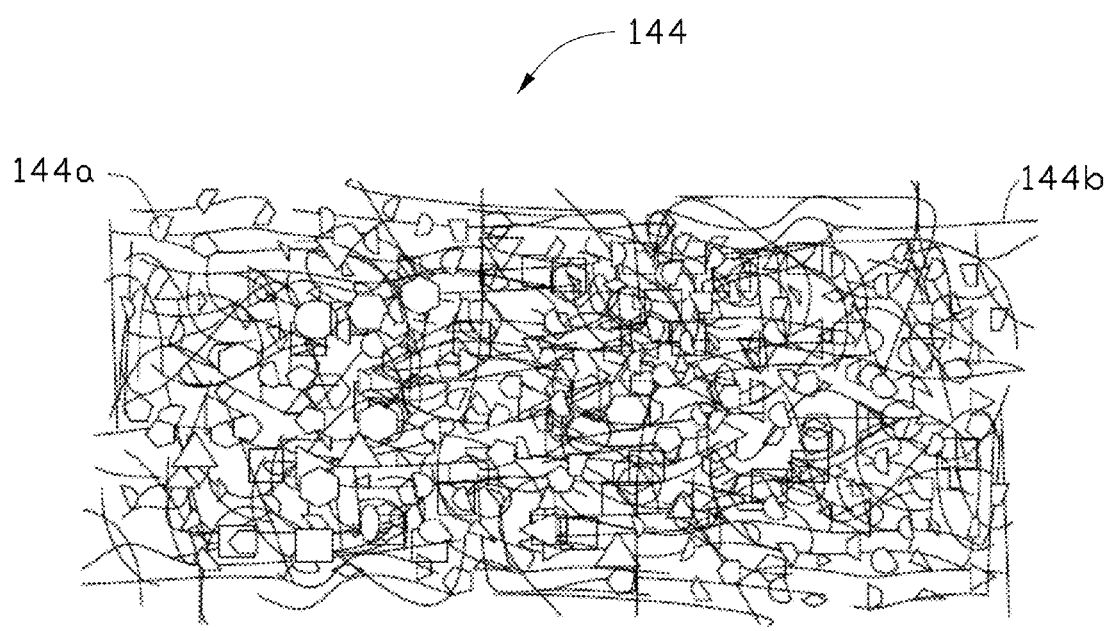
FIG. 3 is a structural schematic view of a lithium ion battery electrode material layer.
Figure 4:
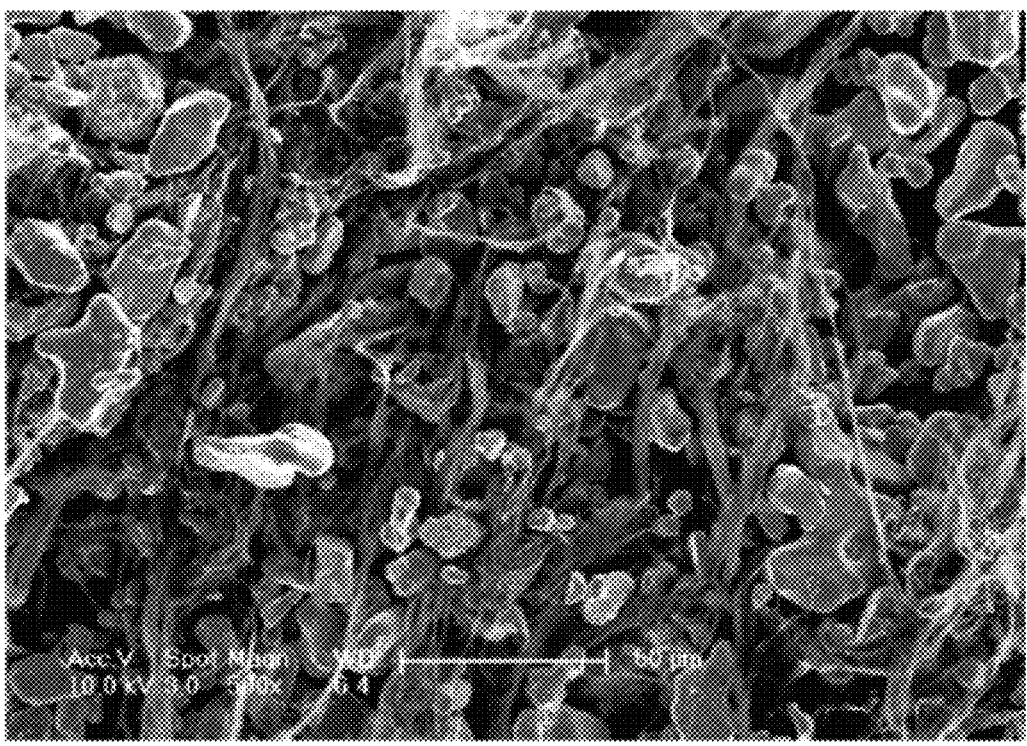
FIG. 4 is an SEM image of one embodiment of a lithium ion battery electrode material layer.

In step S3, referring to FIGS. 3 and 4, the electrode material layer 144 formed by the above steps consists of electrode active material particles 144a and carbon nanotubes 144b. The carbon nanotubes 144b in the electrode material layer 144 can serve as a conductive material and microporous carrier to support and fix the electrode active material particles 144a. Thus, even without using an adhesive, the electrode material layer 144 can be an integrative stable structure due to the net structure composed of the carbon nanotubes 144b. The electrode active material particles 144a are uniformly distributed in the net structure. Specifically, the electrode active material particles 144a can be adhered on or entangled by the carbon nanotubes, or the electrode active material particles 144a can be wrapped by the carbon nanotubes 144b. The electrode active material particles 144a and the carbon nanotubes 144b are in contact with each other without adhesive therebetween. The electrode active material particles 144a and the carbon nanotubes 144b are fixed together by van der Waals attractive force therebetween. A length of the carbon nanotubes 144b can be longer than 200 micrometer, and the carbon nanotubes 144b can be entangled with each other to form the net structure. As such, the electrode active material particles 144a can be fixed by the net structure, and the electrode material layer 144 is free of adhesive.

In step S3, the electrode material layer 144 is attached on the exposed surface of the graphene layer 12b after the electrode material layer 144 is formed. The electrode material layer 144 can combine with the graphene layer 12b via van der Waals attractive force.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making a lithium ion battery electrode comprising:
    providing a support comprising a support surface;
    forming a graphene layer on the support surface of the support, wherein the graphene layer is formed on the support by steps of:
        forming an oxide layer on the support surface of the support using plasma;
        providing a highly oriented pyrolytic graphite having a cleavage surface, wherein the cleavage surface is in contact with the oxide layer;
        applying a pressure on the highly oriented pyrolytic graphite and the support; and
        removing the highly oriented pyrolytic graphite from the support, thereby forming the graphene layer on the oxide layer of the support; and
    applying an electrode material layer on an exposed surface of the graphene layer, wherein the graphene layer is located between the electrode material layer and the support, and the electrode material layer consists of a plurality of electrode active material particles and a plurality of carbon nanotubes wrapped around the plurality of electrode active material particles.

2. The method of claim 1, wherein the electrode material layer is made by the steps of:
    providing the plurality of electrode active material particles, a carbon nanotube source comprising the plurality of carbon nanotubes, and a solvent;
    adding the carbon nanotube source and the plurality of electrode active material particles into the solvent, and agitating the solvent with the carbon nanotube source and the plurality of electrode active material particles; and
    separating the carbon nanotube source and the plurality of electrode active material particles from the solvent to obtain the electrode material layer.

3. The method of claim 2, wherein the carbon nanotube source is made by: providing a substrate and a carbon nanotube array formed on the substrate; and scratching the carbon nanotube array from the substrate to form the carbon nanotube source.

4. The method of claim 2, wherein the solvent is ethanol, glycol, acetone, N-Methyl-2-pyrrolidone, water, or combination thereof.

5. The method of claim 2, wherein the solvent is agitated with ultrasonic waves.

6. The method of claim 5, wherein a power of the ultrasonic waves is in a range from about 400 W to about 1500 W.

7. The method of claim 5, wherein the solvent is agitated for about 2 minutes to about 5 minutes.

8. The method of claim 1, wherein before applying the pressure on the highly oriented pyrolytic graphite, the highly oriented pyrolytic graphite and the support are closely clipped in a clamp to be conveniently pressed.

9. The method of claim 8, wherein the pressure is applied by a pressure force in a range from about 100 N to about 200 N.

10. The method of claim 9, wherein the pressure is applied for about 5 minutes to about 10 minutes.

11. The method of claim 1, wherein the method of forming the graphene layer is carried out in a sterilized room.

12. The method of claim 1, wherein the plurality of electrode active material particles is selected from the group consisting of natural graphite, pyrolysis carbon, and mesocarbon microbeads (MCMB).

13. The method of claim 1, wherein the plurality of electrode active material particles is selected from the group consisting of lithium manganate ($LiMn_2O_4$), lithium cobalt oxide ($LiCoO_2$), lithium nickel oxide ($LiNiO_2$), and lithium iron phosphate ($LiFePO_4$).

14. A method for making a lithium ion battery electrode comprising:
    providing a support comprising a support surface;
    forming a graphene layer on the support surface of the support, wherein the graphene layer is formed on the support by steps of:
        forming an oxide layer on the support surface of the support using plasma;
        providing a highly oriented pyrolytic graphite having a cleavage surface, wherein the cleavage surface is in contact with the oxide layer;
        applying a pressure on the highly oriented pyrolytic graphite and the support; and
        removing the highly oriented pyrolytic graphite from the support, thereby forming the graphene layer on the oxide layer of the support; and
    applying an electrode material layer on an exposed surface of the graphene layer, wherein the graphene layer is located between the electrode material layer and the support, the electrode material layer consists of a plurality of electrode active material particles and a plurality of carbon nanotubes wrapped around the plurality of electrode active material particles, and the plurality of electrode active material particles is a cathode active material selected from the group consisting of lithium manganate (LiMn$_2$O$_4$), lithium cobalt oxide (LiCoO$_2$), lithium nickel oxide (LiNiO$_2$), and lithium iron phosphate (LiFePO$_4$).

* * * * *